Aug. 24, 1965 W. G. ANDERS 3,202,265
CONVEYOR ASSEMBLY FOR CONVEYOR DRIVEN EQUIPMENT
Filed Dec. 28, 1961 4 Sheets-Sheet 1

INVENTOR.
WALTER G. ANDERS.
BY
C. H. Miranda
ATTORNEY

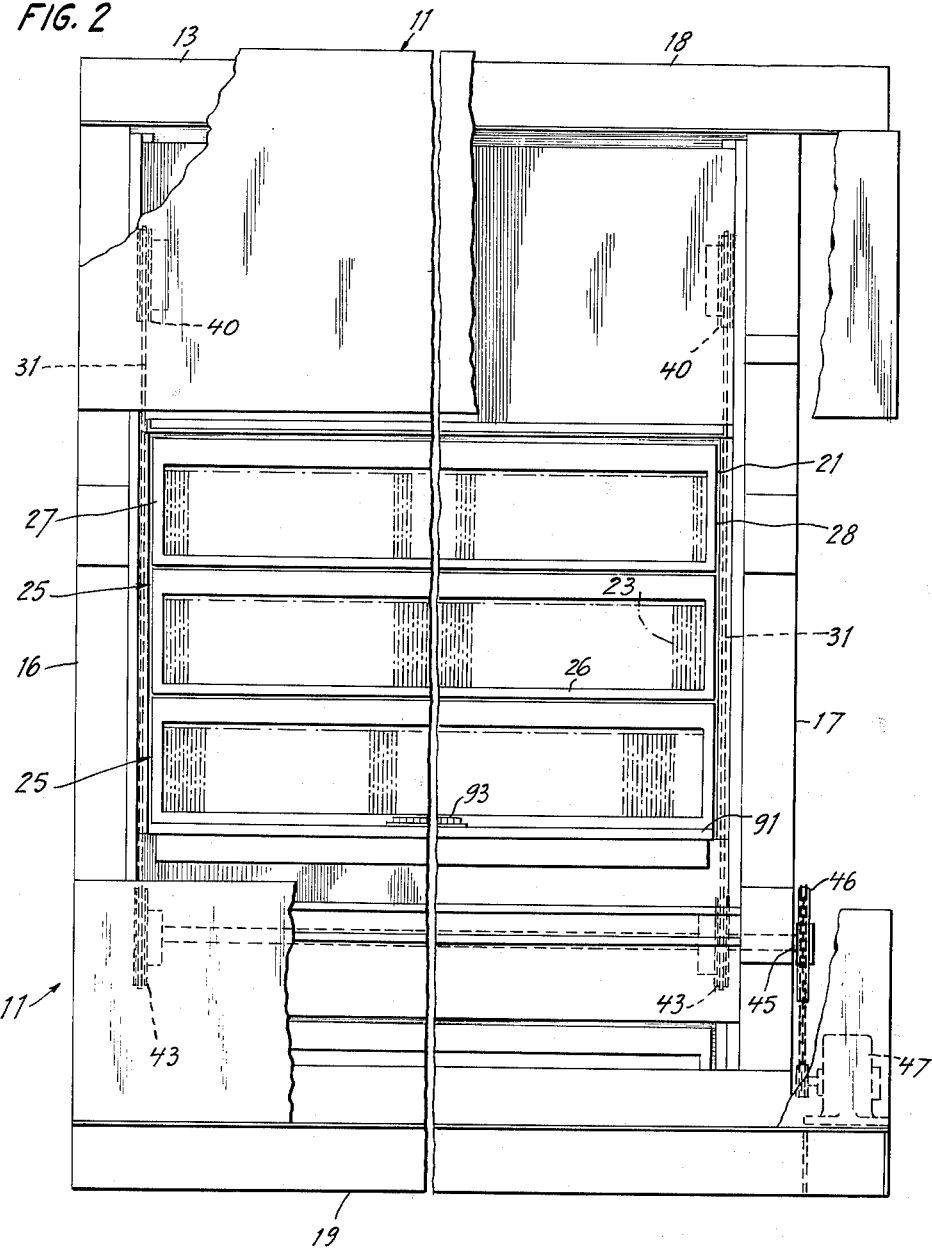

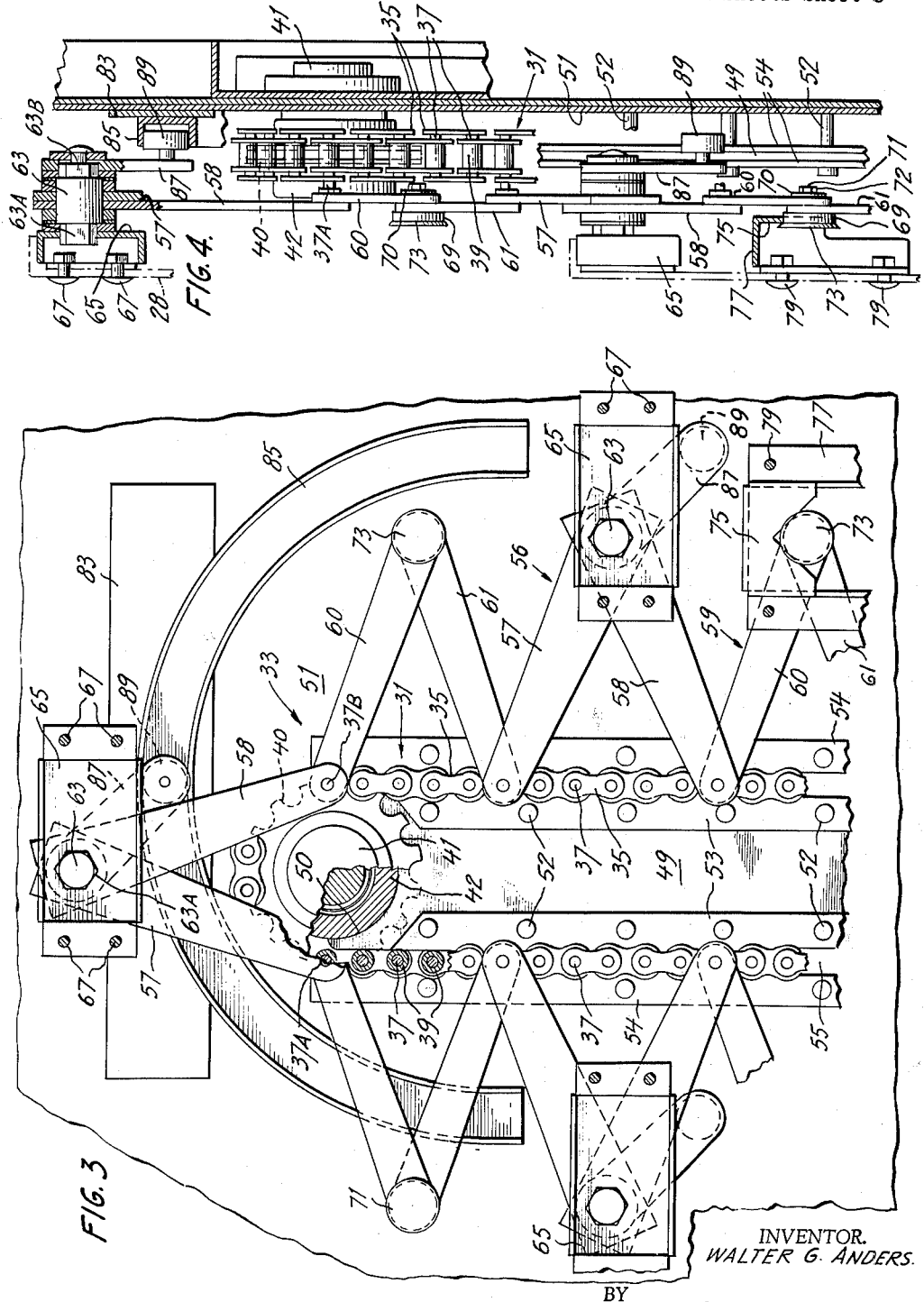

Aug. 24, 1965
W. G. ANDERS
3,202,265
CONVEYOR ASSEMBLY FOR CONVEYOR DRIVEN EQUIPMENT
Filed Dec. 28, 1961
4 Sheets-Sheet 4
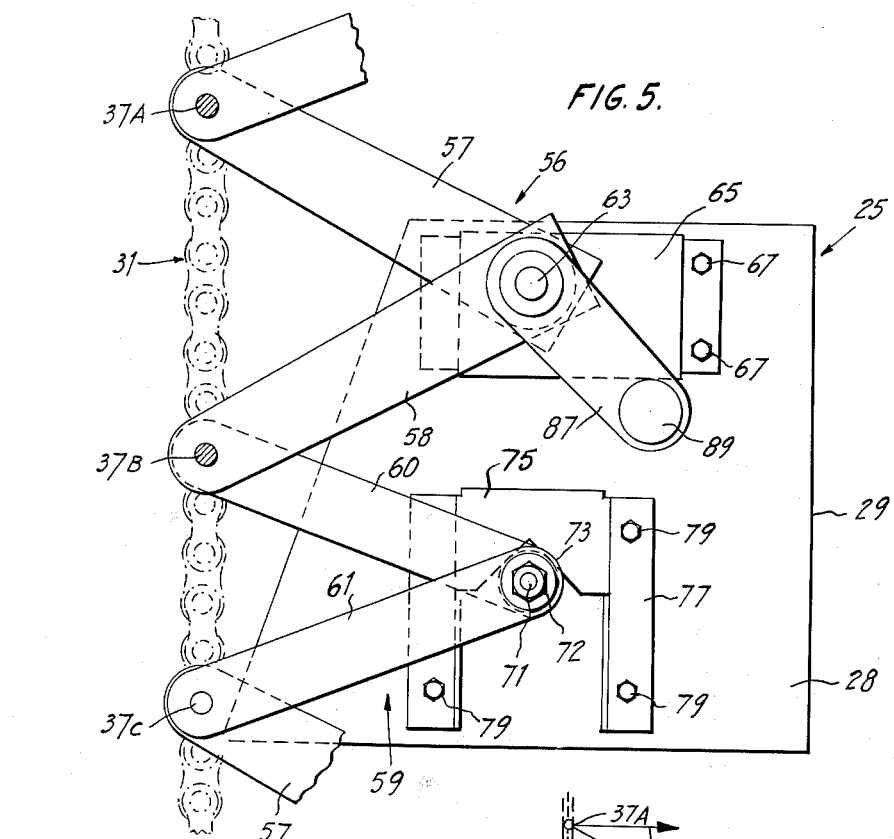
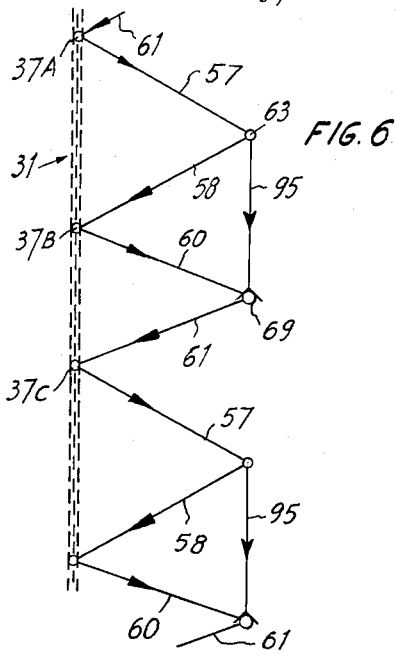
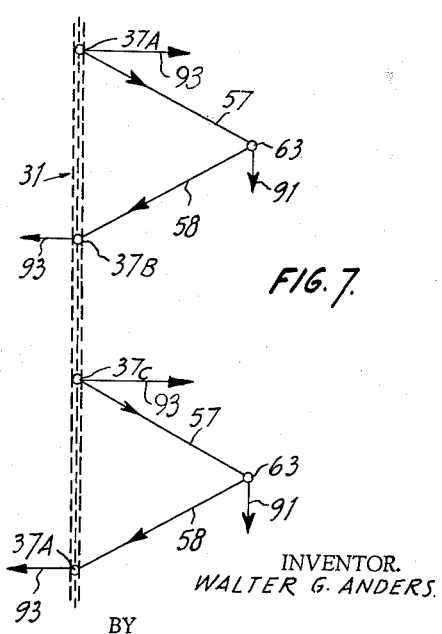
INVENTOR.
WALTER G. ANDERS.
BY
C. M. Miranda
ATTORNEY United States Patent Office 3,202,265
Patented Aug. 24, 1965

3,202,265
CONVEYOR ASSEMBLY FOR CONVEYOR DRIVEN EQUIPMENT
Walter G. Anders, Tonawanda, N.Y., assignor to Sperry Rand Corporation, New York, N.Y., a corporation of Delaware
Filed Dec. 28, 1961, Ser. No. 162,884
9 Claims. (Cl. 198—158)

The present invention relates to conveyor driven equipment and more particularly to the conveyor assembly thereof.

Many types of conveyor driven equipment utilize carriers containing material to be transported from one place to another and which carriers are driven by chain-roller type conveyors. In the construction of some equipment, the carriers are connected directly to the conveyor by means of links, arms and the like and the conveyor is driven from a motor of proper size to provide the power requirements necessary to operate the conveyor. Certain problems have arisen in connection with the operation of conveyor driven equipment in that excessive loading forces are imparted by the carriers and contents thereof to guide surfaces for the conveyor chain. For example, in conveyors which travel in a vertical path, guide tracks generally are arranged on either side of the conveyor chain whereby rollers of the conveyor chain move in rolling contact with the tracks. The weight of the carriers and contents thereof results in loading forces which are transmitted to the conveyor chain by way of the links or the arms. The individual arms are either in tension or compression and the forces acting therein are reflected at the rollers of the conveyor chain, whereby the rollers contact the guide tracks producing high friction forces. As the number of carriers and/or the weight or the contents thereof increase the sum total of the frictional forces acting on the conveyor chain necessitates an increase in the power requirements of the motor. In addition, maintenance problems multiply because of the wear on the chain rollers and the guide tracks.

An object of the present invention is to provide a novel conveyor assembly for conveyor driven equipment.

Another object is to provide a novel conveyor assembly which maintains at a minimum the loading forces affecting the conveyor.

Still another object is to provide a novel chain-type conveyor suspension assembly wherein connected carriers are suspended from the conveyor chain by means of a bridge-like truss linkage.

A further object is to provide a novel conveyor suspension assembly having a linkage arrangement which effects a counter-balancing of forces imparted by the carriers to the conveyor chain to reduce the frictional load or forces on the conveyor chain when the latter moves in a vertical path.

A still further object is to provide a novel conveyor assembly wherein a greater number of carriers may be employed in existing equipment without increasing the size of the motor to drive the conveyor and carriers.

Another object is to provide a novel conveyor assembly having a chain-roller type conveyor movable in a vertical path and between a pair of guide tracks substantially without rolling contact of the rollers with the guide tracks.

Still another object is to provide a novel conveyor assembly wherein excessive wear on the rollers of the conveyor chain is considerably lessened to reduce maintenance and repair costs for conveyor driven equipment to a minimum.

The present invention, therefore, contemplates a novel conveyor assembly for conveyor driven equipment wherein conveyor chains move a plurality of carriers in vertical and non-vertical paths. The carriers are connected to the conveyor chains by a scissor-like linkage arrangement which takes the form of bridge-like truss for the individual carrier with the conveyor chain forming the base of the truss. Each carrier straddles a pair of conveyor chains and is suspended from each chain by two pairs of arms. Each pair of arms has a pivotal connection joining adjacent ends of such arms and the other ends of the arms are pinned to the conveyor chain. The pivotal connection of one pair of arms is secured to the carrier while the pivotal connection of the other pair of arms is in detachable engagement and support with the carrier in its movement through a vertical path.

The above and other objects and advantages of the present invention will appear more fully hereinafter from a consideration of the detailed description which follows taken together with the accompanying drawings wherein one embodiment of the invention is illustrated.

In the drawings wherein like reference characters refer to like parts throughout the several views:

FIG. 2 is a front elevational view of the equipment of FIG. 1;

FIG. 3 is an enlarged fragmentary view of the linkage arrangement shown in FIG. 1;

FIG. 4 is a fragmentary side view, partly in section, and showing the arrangement of FIG. 3;

FIG. 5 is an enlarged fragmentary side view showing the linkage arrangement associated with one carrier and one conveyor chain:

FIG. 6 is a diagrammatic representation of the linkage arrangement of the present invention to illustrate the forces exerted in the arms of such linkage, and FIG. 7 is a diagrammatic representation of a prior linkage arrangement.

Figure 1:
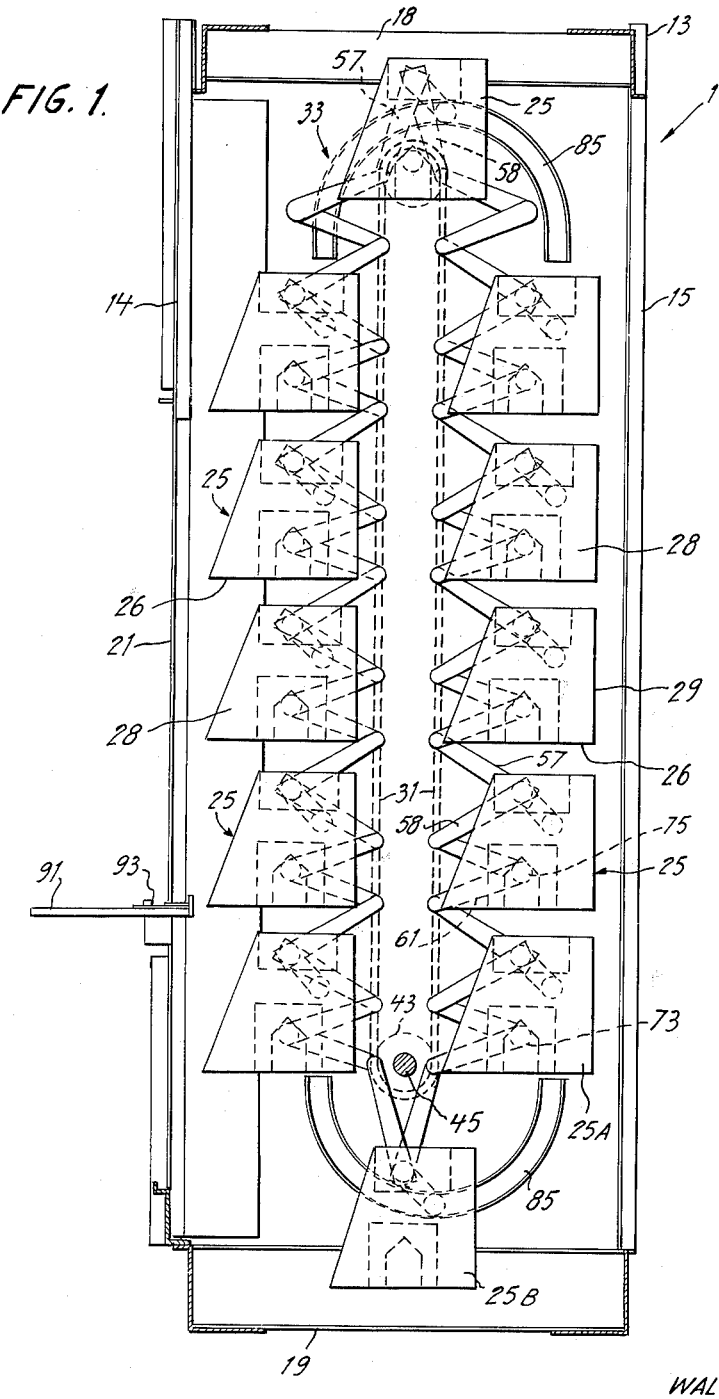
FIG. 1 is a partly schematic illustration of conveyor driven equipment embodying the present invention.

Referring now more particularly to the drawings, FIGS. 1 and 2 illustrate by way of example, an automated conveyor-driven filing equipment, generally designated by the numeral 11, which contains an embodiment of the present invention. Filing equipment 11 comprises a housing 13 having a front wall 14, a rear wall 15, side walls 16 and 17 and a top 18 and bottom 19. An opening 21 is provided in front wall 14 to permit access to media 23 (shown in broken lines in FIG. 2) as for example, folders, books, papers, etc. disposed on elongated horizontally arranged shelf-like carriers 25. Carriers 25 include a base 26, vertical side walls 27 and 28, and an upstanding rear wall 29 (FIG. 5). The carriers 25 are suspended from and straddle a pair of endless conveyor chains 31 (FIG. 2) by means of a linkage arrangement, generally designated by the numeral 33, which is associated with each of the side walls 27 and 28 and includes links or arms arranged in scissor-like fashion to be more fully described hereinafter. The conveyor chains 31 are disposed adjacent housing side walls 16 and 17 and since the chains 31 and linkage 33 are identical for each side wall of carrier 25 description will be made hereinafter of only one set of conveyor chain 31 and linkage 33.

As best seen in FIGS. 3 and 4, each conveyor chain 31 includes links 35 which are joined together by pins 37. Rollers 39 are rotatably mounted on pins 37 and engage an upper sprocket wheel 40 (one for each conveyor chain) secured for rotation with a short shaft 41 having a hub 42. A pair of lower sprocket wheels 43 (one only shown in FIG. 1) are mounted for rotation on a shaft 45 which extends across the width of housing 13. Shaft 45 is journalled within panels (not shown) adjacent side walls 16 and 17 of housing 13. Shaft 45 extends through side wall 17 of housing 13 (FIG. 2)

and has mounted thereon, exterior of housing 13, a third sprocket wheel 46 which is chain-driven from a reversible motor 47 (FIG. 2). Lower sprocket wheels 43 accommodate in meshing engagement rollers 39 of the conveyor chains 31 and thus such wheels constitute the driver sprocket wheels for the conveyor assembly. Operation of motor 47 accordingly effects movement of the conveyor chains 31 in vertical paths and over the wheels 40 and 43 in an arcuate or non-vertical path.

A vertically disposed center strip 49 is provided for each conveyor chain 31 and has an upper edge 50 shaped to fit snugly about hub 42 and a lower edge (not shown) shaped to accommodate the hub (not shown) for lower sprocket wheel 43. Center strip 49 is secured to a panel 51 (FIG. 4) by means of posts 52. A pair of spaced vertical guide tracks 53 are provided in abutting relationship with strip 49 on either side thereof and secured by the posts 52 to the strip. A second pair of guide tracks 54 are provided in spaced relationship with guide tracks 53 to define a channel 55 in which the rollers 39 move.

Coming now to the linkage arrangement 33 of the present invention, FIG. 5 clearly discloses a portion of the linkage and particularly that associated with one side wall 28 of a particular carrier. As seen in the mentioned FIG. 5 the linkage 33 comprises an upper pair 56 of arms 57 and 58 and a lower pair 59 of arms 60 and 61. Arms 57 and 58 are pivotally joined by a pin 63 (FIGS. 4 and 5) having nuts 63A and 63B and which pin is mounted on a bracket 65 secured to the side wall 28 of the carrier by threaded means 67. The other ends of arms 57 and 58 are pivotally secured to elongated pins 37A and 37B of conveyor chain 31. Pin 37B also has pivotally secured thereto one end of arm 60 while the corresponding end of arm 61 is pivotally mounted on a pin 37C of chain conveyor 31. The other ends of arms 60 and 61 are pivotally joined together by the reduced diameter portion of a support member 69 which holds said other ends to member 69 by a washer 70, bolt 71 and nut 72. Member 69 is provided with a lip portion 73 to detachably engage a V-shaped portion 75 of a bracket 77 secured to the side wall 28 of carrier 25 in any suitable assembly by threaded members 79. As seen in FIG. 5, pin 63 and support member 69 are disposed in vertical alignment. As pointed out hereinabove, side wall 27 of carrier 25 has associated therewith an identical linkage arrangement and therefore description thereof is unneccessary.

Panels 51 are located in housing 13 adjacent side walls 16 and 17, respectively, and secured in any suitable manner as for example by welding to the upper and lower portions of such panels are horizontally disposed reinforcement members 83. An arcuate guide track 85 of substantially U-shaped configuration in transverse cross-section is secured to each member 83. A stabilizer arm 87 is secured to each nut 63B as to be stationary with respect to the latter and carries at its other end a rotatable roller 89 which may be accommodated for rolling contact in arcuate track 85. The ends of track 85 are linear or straight as seen in FIG. 3 to permit ready entry of rollers 89 into the tracks.

A horizontally disposed posting table 91 is provided on front wall 14 immediately below access opening 21. Key buttons 93 are arranged on table 91 and are connected in electrical circuits (not shown) to control the operation of motor 47. In general, a key button 93 may be provided for each carrier 25 whereby depression of the proper key button effects selective positioning of a particular carrier within the access opening 21.

In operation, depression of the proper key button 93 effects operation of motor 47 which drives sprocket wheel 46 to turn shaft 45 and sprocket wheels 43 mounted thereon. As a result, conveyor chains 31 are moved in their vertical and arcuate paths to displace the carriers 25 from positions shown in FIG. 1. In the movement of the carriers 25 in their vertical paths, support member 69 is in engagement with V-shaped portion 75 of bracket 77 and arms 60 and 61 carry the weight of the carrier and contents thereof along with the upper pair 56 of arms 58 and 59. As the uppermost carrier 25 below upper track 85 approaches the latter, roller 89 on arm 87 enters track 85 to stabilize the particular carrier 25 in its travel through the non-vertical path. Support member 69 in such path and after the roller 39 is in track 85 disengages from V-shaped portion 75 as shown in FIG. 1. As the particular carrier moves in the track 85 and thence below and away from the track, the pair 59 of arms 60 and 61 in advance of such carrier (going in the direction of bottom 19 of housing 13) moves into a position whereby it engages the V-shaped portion 75 to aid in supporting the weight of such carrier. In the lower portion of housing 13, after a carrier enters track 85, support member 69 disengages from V-shaped portion 75 and the movement of said member 69 is accelerated in its arcuate travel, whereby it precedes the carrier to engage the V-shaped portion 75 of the carrier in front of the carrier with which it was last associated. For example, if the carriers adjacent rear wall 15 in FIG. 1 are assumed to be moving downwardly and the carriers adjacent front wall 14 are moving upwardly, the support member 69 associated with carrier 25A is disengaged from the V-shaped portion 75 of such carrier shortly after the roller 89 engages track 85 and the carrier commences its arcuate travel. The support member 69 accelerates ahead of carrier 25A to engage the V-shaped portion of carrier 25B just as the latter commences its vertical travel upwardly and before its associated stabilizer roller 89 leaves track 85. Thus, each of the carriers 25 in their vertical paths are supported by the arms of pairs 56 and 59 while the carriers in their arcuate paths are supported by arms 57 and 58 and stabilizer arm 87.

The advantages and operation of linkage 33 may be better understood from a consideration of FIGS. 6 and 7 which schematically represent the linkage of the present invention and the linkage of prior construction, respectively. It will be apparent from FIG. 6 that the linkage associated with one side wall of a carrier 25 forms a bridge-like truss with the conveyor chain 31 forming the base of the truss. On the other hand, the linkage of FIG. 7 merely provides for suspension of the carrier from the conveyor chain and comprises a single pair of arms which are comparable to the pair 56 of arms 57 and 58 in that the pivotal connection is fixed to the side wall of the carrier. Accordingly, corresponding elements of FIG. 7 have been designated with reference characters found in FIG. 6. Arrow 91 represents the direction of force of the weight of the carriers and contents impressed upon pin 63. It is apparent that when the carrier is in its vertical path, arm 57 is in tension whereas arm 58 is in compression. A force represented by arrow 93 is exerted in the direction indicated on pins 37A and 37B and thereby on rollers 37 associated with said pins with such forces acting normal to the conveyor chain. As a result, the rollers 37 on pins 37A and 37B are moved against and in rolling contact with guide tracks 53 and 54 to thereby generate frictional forces which need be overcome by the motor to drive the conveyor assembly.

The linkage 33 of the present invention shown in FIG. 6 represents a considerable improvement over the arrangement of FIG. 7. In FIG. 6, a line 95 replaces arrow 91 in FIG. 7 and represents a link for force analysis purposes which equally distribute the load of the carrier and contents between pin 63 and member 69 when the carriers are in the vertical path. In the present invention, arms 57 and 58 are still in tension and compression, respectively, however, arm 60 is in tension while arm 61 is in compression. As may be seen from FIG. 6, the force imparted to pin 37A by arm 61 acts in a direction opposite to the force imparted to pin 37A by arm 57 whereby the forces acting on the pin are counterbalanced or cancelled. Similarly, in the case of pins 37B and 37C the forces exerted thereon by the connected arms are cancelled. Since the forces acting on the rollers associated with pins 37A, 37B and 37C are substantially cancelled, the rollers do not contact the guide tracks 53 and 54, whereby frictional forces associated with engagement of the rollers with the tracks are not encountered in the vertical run of the conveyor chain.

It will be apparent from the foregoing that the present invention provides a novel conveyor assembly for conveyor driven equipment. By providing a bridge-like truss suspension assembly linkage for carriers, the weight of the carriers and contents is split in such manner that the force from one arm attached to each chain roller is balanced by a force from the other link which is connected to the same chain roller, and large frictional forces normally generated by engagement of the conveyor chain with the guide tracks are eliminated. Furthermore, since stabilizer arms with rollers are not required in the vertical arm of the conveyor chain and carrier the guide tracks for such stabilizer rollers in the vertical arms are unnecessary.

It is to be expressly understood that although the present invention has been disclosed environmentally in automated filling equipment the invention is not to be limited to such equipment. In addition, the number of carriers shown in the drawings is for illustration purposes only inasmuch as a greater or lesser number of carriers may be employed in conjunction with the present invention.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In conveyor driven equipment of the class described, a conveyor including a pair of spaced endless conveyor chains movable along a vertical path, a plurality of carriers having opposite ends arranged between said spaced conveyor chains, means interconnecting said carriers to said conveyor chains to transmit motion of the conveyor to the carriers, said interconnecting means including a first and a second linkage means for each carrier at one end of said carriers and connected to the carriers and to one of said conveyor chains, said first and second linkage means each carrying a portion of the weight of the carriers and subjected to compression and tension forces, said first linkage means including a pair of arms pivotally joined at adjacent ends by a pivotal connection secured to the said one ond of the carriers, the other ends of said pair of arms being attached at spaced points on said one conveyor chain, each of said arms being subjected to either a compression force or a tension force and exerting a force on its point of attachment to said one conveyor chain, said second linkage means including a pair of second arms joined at adjacent ends by a pivotal connection engaging the carrier, the other ends of said pair of said second arms being attached at spaced points on said one conveyor chain, each of said second arms being subjected to either a compression force or a tension force and exerting a force on its point of attachment to said one conveyor chain, the adjacent arms of said first and said second linkage means for an individual carrier having unlike forces exerted thereon and having a common point of attachment to said one conveyor chain for those arms.

2. The equipment defined in claim 1 wherein the conveyor also moves through a non-vertical path and the pivotal connection of the pairs of second arms loosely engage the said one end of the carriers through the vertical path and are displaced out of supporting engagement with the carriers upon movement of said one conveyor chain through a non-vertical position.

3. The equipment defined in claim 1 wherein the angle defined between the arms of each pairs of arms is less than 90 degrees.

4. The equipment defined in claim 1 wherein the pivotal connections of the first mentioned and second mentioned pairs of arms are secured to and in loose engagement, respectively, with the individual carrier in a vertically disposed plane.

5. The equipment defined in claim 4 wherein the carriers each include a vertically disposed side wall and the pivotal connection of the pair of first arms is on said side wall above the point of engagement of the pivotal connection of the pair of second arms with said side wall of the carrier.

6. In conveyor driven equipment of the class described, a conveyor including a pair of spaced endless conveyor chains movable through a vertical path, a plurality of carriers arranged between said conveyor chains, and linkage means interconnecting the carriers with said conveyor chains to transmit motion of the latter to the carriers, said linkage means for one of said conveyor chains including a pair of first upper and lower arms and a pair of second upper and lower arms for each carrier, said first and said second arms being arranged in a continuous scissor-like manner and each pair of arms having a pivotal connection in engagement with the carrier and the free ends of said arms attached to said one conveyor chain, the pivotal connection of the pair of first arms being disposed above the pivotal connection of the pair of second arms on the individual carrier, the upper first and second arms of the pairs being subjected to tension forces therein and the lower first and second arms of the pairs being subjected to compression forces, the lower first arm and the upper second arm for a particular carrier having a common point of attachment on said one conveyor chain, the upper first arm of said particular carrier having a common point of attachment with the lower second arm associated with the carrier immediately above said particular carrier, and the lower second arm of said particular carrier having a common point of attachment on said one conveyor chain with the upper first arm associated with the carrier immediately below said particular carrier.

7. The equipment defined in claim 6, wherein the pivotal connections of the pair of first arms is secured to the carrier, and the pivotal connection of the pair of second arms is in loose engagement with the carriers and displaced out of supporting engagement therewith upon movement of the said one conveyor chain through a non-vertical position.

8. In a conveyor driven equipment of the class described, a conveyor including a pair of spaced endless conveyor chains movable through vertical paths, a plurality of carriers arranged between said spaced conveyor chains, each of said carriers having a horizontally disposed portion and an upstanding side wall at each end of said horizontal portion, and a first and a second linkage means at each side wall of the carriers connected to said conveyor chains and to the carriers to transmit motion of the conveyor to the carriers, said first and said second linkage means at each side wall carrying a portion of the weight of the carriers and subjected to compression and tension forces, said first linkage means including a pair of arms pivotally joined at adjacent ends by pivotal connection secured to the side wall of the carrier, the other ends of said pair of arms being attached at spaced points on said one conveyor chain, each of said arms being subjected to either a compression force or a tension force and exerting a force on its point of attachment to said one conveyor chain, said second linkage means including a pair of second arms joined at adjacent ends by a pivotal connection engaging the side wall of the carrier, the other ends of said pair of said second arms being attached at spaced points on said one conveyor chain, each of said second arms being subjected to either a compression force or a tension force and exerting a force on its point of attachment to said one conveyor chain, said second linkage means including a pair of second arms joined at adjacent ends by a pivotal connection engaging the side wall of the carrier, the other ends of said pair of said second arms being attached at spaced points on said one conveyor chain, each of said second arms being subjected to either a compression force or a tension force and exerting a force on its point of attachment to said one conveyor chain, the adjacent arms of said first and said second linkage means for an individual carrier having a common point of attachment to said one conveyor chain for those arms having unlike forces exerted therein.

9. In conveyor driven equipment of the class described, a conveyor movable along a vertical path, said conveyor including a pair of spaced conveyor chains, a plurality of carriers arranged between said conveyor chains and movable by said conveyor along said vertical path, a plurality of spaced points of connection on each of said conveyor chains, a plurality of pairs of pivotal arms interconnecting the carriers to the conveyor chains, a pair of said pivotal arms for each spaced point of connection on one of said conveyor chains and said pair of arms having adjacent ends pivotally connected to each other and to the point of spaced connection on said one conveyor chain and the other ends of the pair of arms being divergent towards the carrier, a pair of spaced points of connection on each carrier adjacent said one conveyor chain, alternate pairs of said pairs of pivotal arms on said one conveyor chain having the ends of their divergent arms in pivotal connection with each of said pair of spaced points of connection on a carrier, the other pairs of pivotal arms intermediate the alternate pairs of arms having the ends of their divergent arms each in pivotal connection with an end of a divergent arm of an adjacent pair of said alternate arms.

References Cited by the Examiner
UNITED STATES PATENTS

| | | | |
|---|---|---|---|
| 1,859,874 | 5/32 | James. | |
| 2,813,770 | 11/57 | Scholfield | 312—268 |
| 2,816,000 | 12/57 | Scholfield | 312—268 |
| 2,940,810 | 6/60 | Graber | 312—268 |

SAMUEL F. COLEMAN, *Primary Examiner.*

WILLIAM B. LA BORDE, ERNEST A. FALLER, JR.,
*Examiners.*